United States Patent [19]
Newman

[11] Patent Number: 5,983,968
[45] Date of Patent: Nov. 16, 1999

[54] ROUTER BASE ADAPTER UNIT FOR SMALL TEMPLATES

[76] Inventor: Roger R. Newman, 20 Lytton Blvd., Toronto, Canada, M14R 1L1

[21] Appl. No.: 09/207,520

[22] Filed: Dec. 9, 1998

[51] Int. Cl.⁶ ..................................... B27M 3/00
[52] U.S. Cl. .................. 144/372; 144/48.6; 144/137; 144/144.1; 144/144.51; 409/130
[58] Field of Search ............... 144/48.6, 134.5, 144/135.2, 136.95, 137, 144.1, 145.2, 145.3, 154.5, 371, 372, 144.51; 409/125, 130, 178, 182, 97, 110

[56] References Cited

U.S. PATENT DOCUMENTS

| | | | |
|---|---|---|---|
| 3,332,462 | 7/1967 | Williams | 144/136.95 |
| 4,777,991 | 10/1988 | Adame | 144/136.95 |
| 5,117,879 | 6/1992 | Payne | 144/48.6 |
| 5,584,328 | 12/1996 | Grisley | 144/144.1 |

OTHER PUBLICATIONS

De Cristoforo, R.J., *The Portable Router Book, 2nd Edition* (Blue Ridge Summit, PA: Tab Books, 1994) pp. 222–226.

*Primary Examiner*—W. Donald Bray
*Attorney, Agent, or Firm*—Bereskin & Parr

[57] ABSTRACT

An apparatus for use with a portable router, a small template, and a template guide to rout virtually any shape onto workpieces that would normally be considered too small for standard portable routers to handle. The apparatus comprises a main body for supporting a router; locating means for locating the router with respect to the main body and mounted on the main body; support means extending down from the main body, for supporting the main body on a support surface for movement across the support surface; and a template guide mountable on the router around the router bit and extending below the support means, whereby, in use, with a workpiece and a template secured to the support surface and with a template on top of the workpiece, the router is supported by the main body and the support means above the template and workpiece and the template guide abuts the template to guide the router bit around the template.

20 Claims, 16 Drawing Sheets

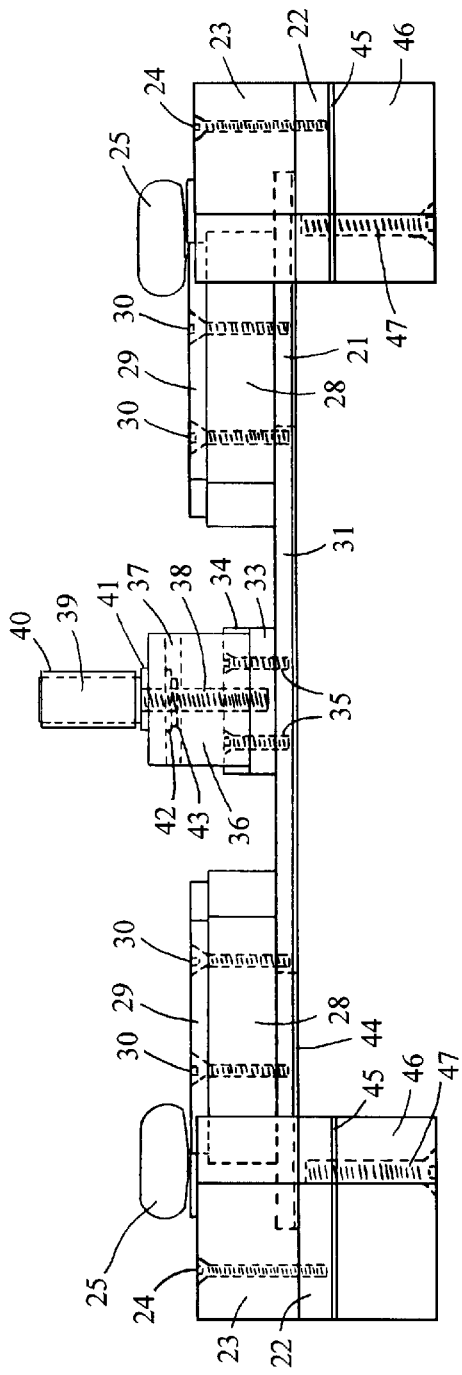
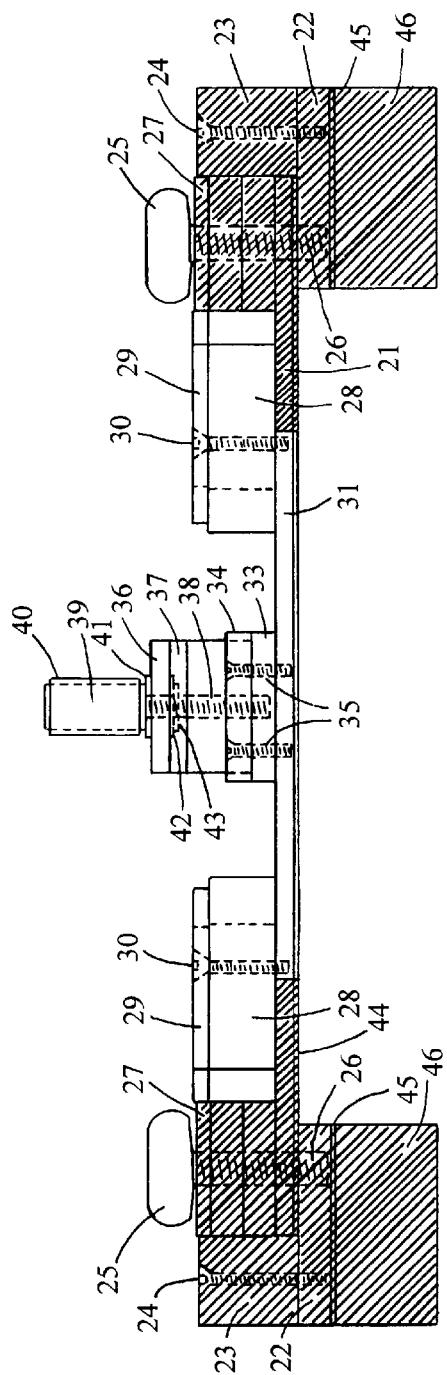

TABLE A

| SPAN | ROW | HOLES | SPAN | ROW | HOLES | SPAN | ROW | HOLES |
|---|---|---|---|---|---|---|---|---|
| 3/8" | A | 1 & 2 | 1-5/8" | B | 1 & 5 | 2-7/8" | C | 1 & 8 |
| 7/16" | A | 11 & 12 | 1-11/16" | B | 8 & 12 | 2-15/16" | C | 5 & 12 |
| 1/2" | B | 1 & 2 | 1-3/4" | C | 1 & 5 | 3" | A | 1 & 9 |
| 9/16" | B | 11 & 12 | 1-13/16" | C | 8 & 12 | 3-1/16" | A | 4 & 12 |
| 5/8" | C | 1 & 2 | 1-7/8" | A | 1 & 6 | 3-1/8" | B | 1 & 9 |
| 11/16" | C | 11 & 12 | 1-15/16" | A | 7 & 12 | 3-3/16" | B | 4 & 12 |
| 3/4" | A | 1 & 3 | 2" | B | 1 & 6 | 3-1/4" | C | 1 & 9 |
| 13/16" | A | 10 & 12 | 2-1/16" | B | 7 & 12 | 3-5/16" | C | 4 & 12 |
| 7/8" | B | 1 & 3 | 2-1/8" | C | 1 & 6 | 3-3/8" | A | 1 & 10 |
| 15/16" | B | 10 & 12 | 2-3/16" | C | 7 & 12 | 3-7/16" | A | 3 & 12 |
| 1" | C | 1 & 3 | 2-1/4" | A | 1 & 7 | 3-1/2" | B | 1 & 10 |
| 1-1/16" | C | 10 & 12 | 2-5/16" | A | 6 & 12 | 3-9/16" | B | 3 & 12 |
| 1-1/8" | A | 1 & 4 | 2-3/8" | B | 1 & 7 | 3-5/8" | C | 1 & 10 |
| 1-3/16" | A | 9 & 12 | 2-7/16" | B | 6 & 12 | 3-11/16" | C | 3 & 12 |
| 1-1/4" | B | 1 & 4 | 2-1/2" | C | 1 & 7 | 3-3/4" | A | 1 & 11 |
| 1-5/16" | B | 9 & 12 | 2-9/16" | C | 6 & 12 | 3-13/16" | A | 2 & 12 |
| 1-3/8" | C | 1 & 4 | 2-5/8" | A | 1 & 8 | 3-7/8" | B | 1 & 11 |
| 1-7/16" | C | 9 & 12 | 2-11/16" | A | 5 & 12 | 3-15/16" | B | 2 & 12 |
| 1-1/2" | A | 1 & 5 | 2-3/4" | B | 1 & 8 | 4" | C | 1 & 11 |
| 1-9/16" | A | 8 & 12 | 2-13/16" | B | 5 & 12 | 4-1/16" | C | 2 & 12 |

ROUTER BASE ADAPTER UNIT FOR SMALL TEMPLATES

FIELD OF THE INVENTION

This invention relates to a router base adapter unit for use with a portable router, a small template, and a template guide to rout virtually any shape onto workpieces that would normally be considered too small for standard portable routers to handle.

BACKGROUND OF THE INVENTION

In order to cut small intricate shapes using a router it is often necessary to employ a template having the size and shape desired. A method of making and using such templates is disclosed in the literature including De Cristoforo, R. J., *The Portable Router Book, 2nd Edition* (Blue Ridge Summit, Pa.: TAB Books, 1994) at pp. 222–226. Types of templates include various sizes and designs of letters and numbers and other customized shapes. These templates are typically tack-nailed or spot glued onto a workpiece, and the surrounding workpiece material is then removed to transfer the shape of the template onto the workpiece. In order to accommodate the thickness of the template, it is necessary to raise the base of the router above the surface of the workpiece. Runner and base designs for raising a router base is shown in the literature including Spielman, P., *Router Jigs and Techniques* (New York: Sterling Publishing Co., 1988) at pp. 203–205. The runners shown on page 203 and 204 of Spielman position the router bit flush with the surface of the workpiece. This setup is used for trimming plugs which are protruding from the top surface of the workpiece and does not disclose the use of a template.

While the use of templates, and runners to raise the base of the router is known, the prior art fails to show how a router can be used with a template to rout intricate shapes and designs into small workpieces. In particular, the prior art does not show how small workpieces can be secured, how a template shape can be transferred to small workpieces of varying thicknesses, and how the shape of the template can be transferred through the entire thickness of the workpiece.

SUMMARY OF THE INVENTION

The present invention provides a router base adapter unit, designed for use with a portable router, a small template, and a template guide, which can be used to transfer the shape of the template onto small workpieces of various thicknesses.

In a first aspect, the present invention provides an apparatus for use with a router and a workpiece, the router having a router base and a router bit extending down through the centre of the router base, the apparatus comprising: a main body for supporting the router; locating means for locating the router with respect to the main body and mounted on the main body; support means extending down from the main body, for supporting the main body on a support surface for movement across the support surface; and a template guide mountable on the router around the router bit and extending below the support means, whereby, in use, with a workpiece and a template secured to the support surface and with a template on top of the workpiece, the router is supported by the main body and the support means above the template and workpiece and the template guide abuts the template to guide the router bit around the template.

The main body can include a support plate, on which the router is mounted in use, and the support plate includes a central hole for the router bit and the template guide, the template guide having a length sufficient to project below the support plate for engaging the template in use.

Preferably, the main body includes a plurality of holding blocks located around the periphery of the support plate, for locating the router in position.

Conveniently, when using a router having a generally circular base, the holding blocks are uniformly spaced around the periphery of the support plate and are located at a substantially common radial distance from the central hole.

The support means can comprise at least one spacer foot extending downwardly from the support plate and including a generally planar bottom surface, for sliding movement across the support surface.

A preferred variant of the invention includes a plurality of spacer feet, wherein the height of each spacer foot is adjustable.

Advantageously, each spacer foot includes a plurality of stackable spacers and means for securing the spacer foot and a selected number of the spacers beneath the support plate.

The present invention includes at least one mounting block, which mounting block includes a plurality of bores for fastening means for fastening a template and a workpiece to the support surface.

Conveniently, the bores are located on a grid pattern and are adapted to receive screws.

In another aspect, the present invention provides a method of routing a workpiece using a template, for a workpiece that is too small to provide an adequate support surface for a router, the method comprising: (1) securing the workpiece and the template to a support surface with the template on top of the workpiece; (2) providing a conventional router having a router base and a router bit extending down through the centre of the router base with an apparatus for supporting the router on the support surface for movement across the surface and with a template guide mounted around the router bit and extending downwardly sufficiently to abut the template; and (3) operating the router, and traversing the router and the apparatus across the support surface while maintaining the template guide in abutment with the template, thereby causing the router bit to cut a profile in the workpiece determined by the template.

Preferably, the method includes providing an apparatus including a support plate for supporting the base of the router, and adjustable spacer feet secured to the support plate, and wherein the method comprises adjusting the height of the support feet, in dependence upon the combined height of the template and the workpiece, so that the support plate and the router are spaced above the template and so that the template guide extends down a sufficient distance to abut the template.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention.

FIG. 9 shows a side view of the router base adapter unit shown in FIG. 6;

FIG. 10 shows a cross-sectional side view taken along the line II—II indicated in FIG. 6;

FIG. 24 shows a Table of possible distances between two mounting holes;

DETAILED DESCRIPTION OF THE INVENTION

For the purpose of discussion in this specification, the apparatus which is the subject matter of the present invention will often be referred to as a "shapeguide", as it enables the router to be guided around various shapes.

The apparatus of the present invention comprises two main parts: a router base adapter unit for attaching to a standard hand-held router, and a working platform on which a small workpiece and a template is fastened during a routing operation.

Figure 1A:
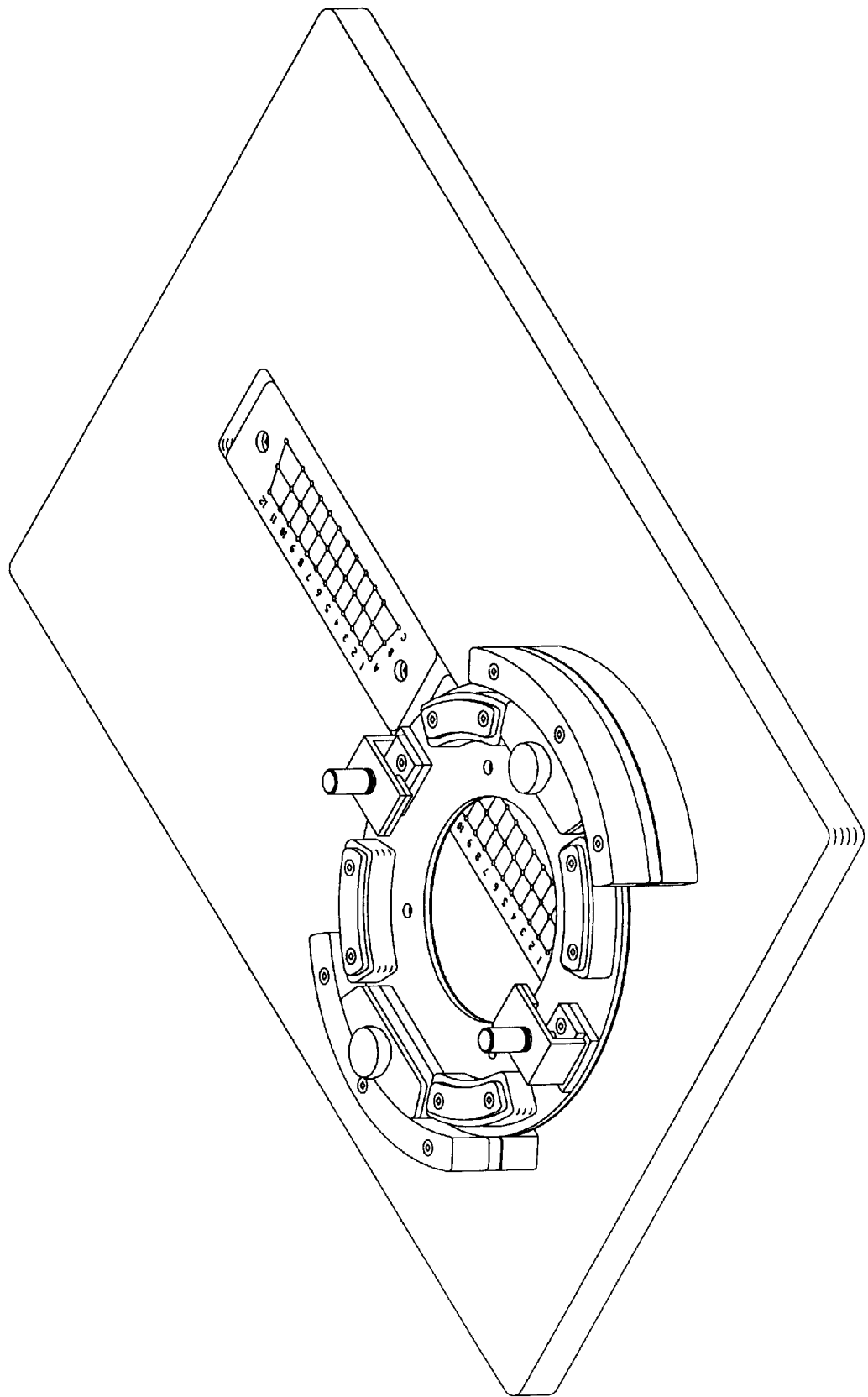
FIG. 1A shows an isometric view of a router base adapter unit positioned on top of a working platform.
Figure 1B:
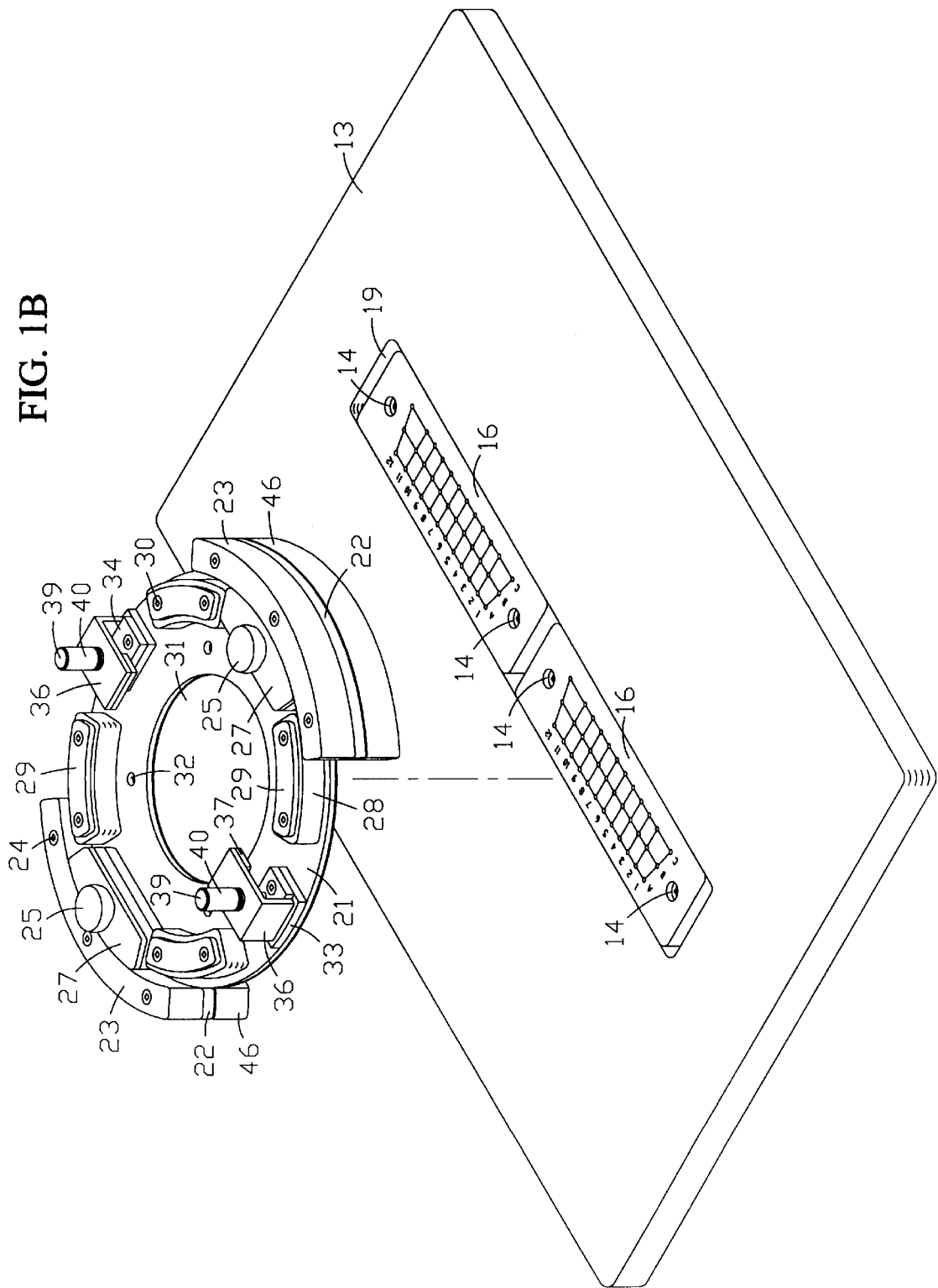
FIG. 1B shows the router base adapter unit raised above the surface of the working platform to show mounting blocks having a grid pattern of holes.

Referring to FIG. 1A, a router base adapter unit is shown resting on top of a working platform. As shown in FIG. 1B the router base adapter unit may be lifted completely off the working platform. While resting on the working platform, the router base adapter unit is designed to be freely slidable on the top surface of the working platform.

Figure 1C:
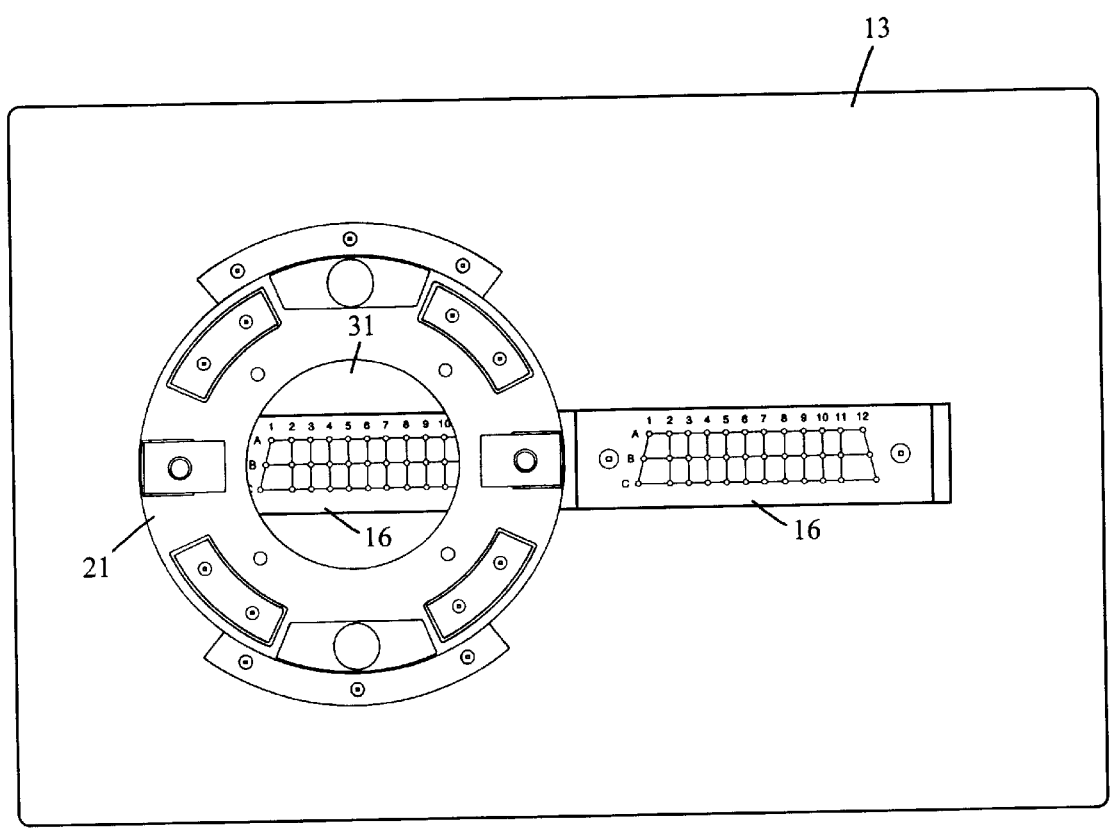
FIG. 1C shows a top view of the router base adapter unit and working platform.

FIG. 1C shows a top view of the router base adapter unit resting on top of the workpiece. A mounting block 16 can be seen through the large circular hole 31 in the adapter unit.

Figure 1D:
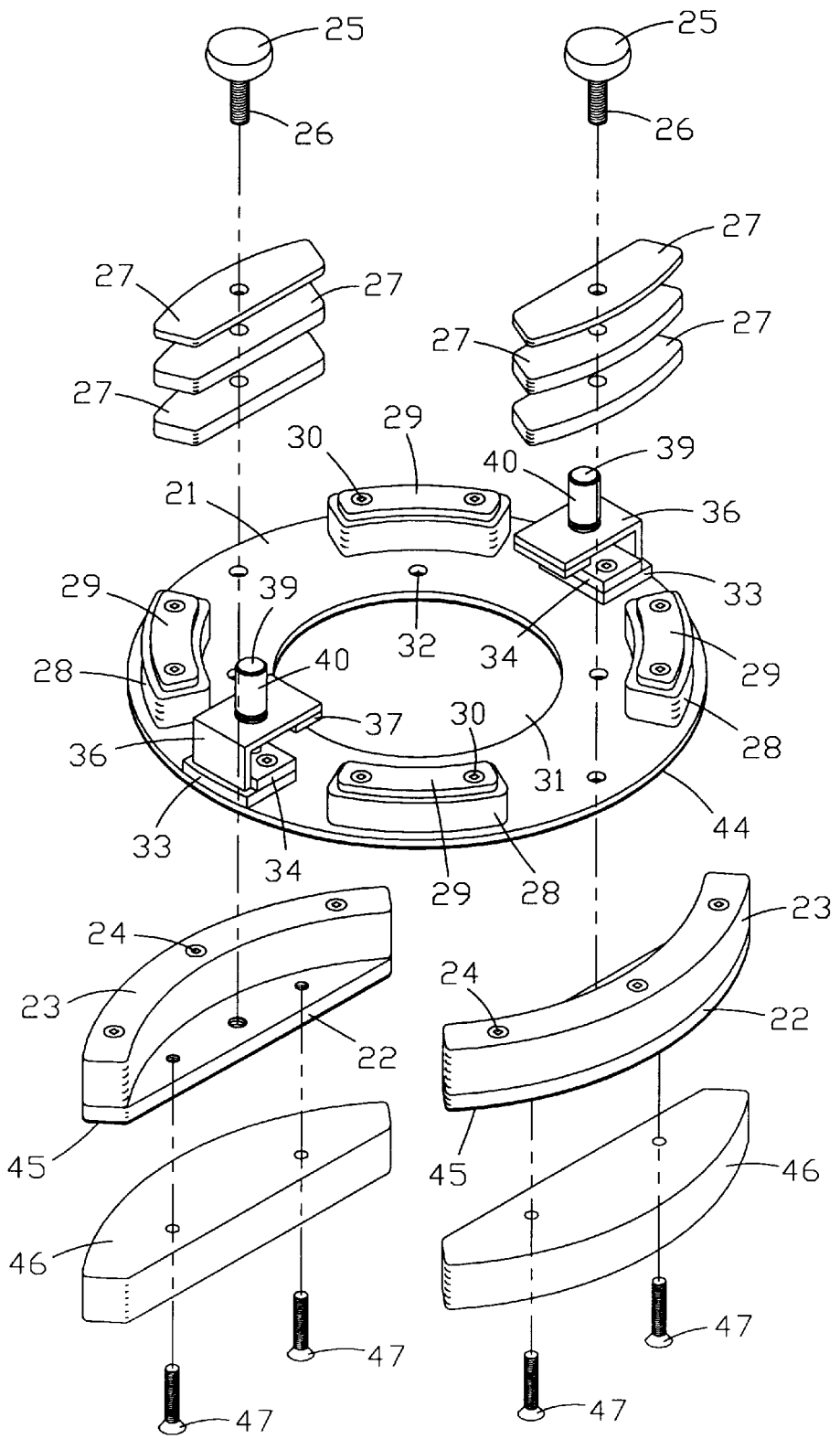
FIG. 1D shows an exploded isometric view of the router base adapter unit.

FIG. 1D shows an exploded isometric view of the various components of the router base adapter unit. Each of the components are described in greater detail below.

Figure 2:
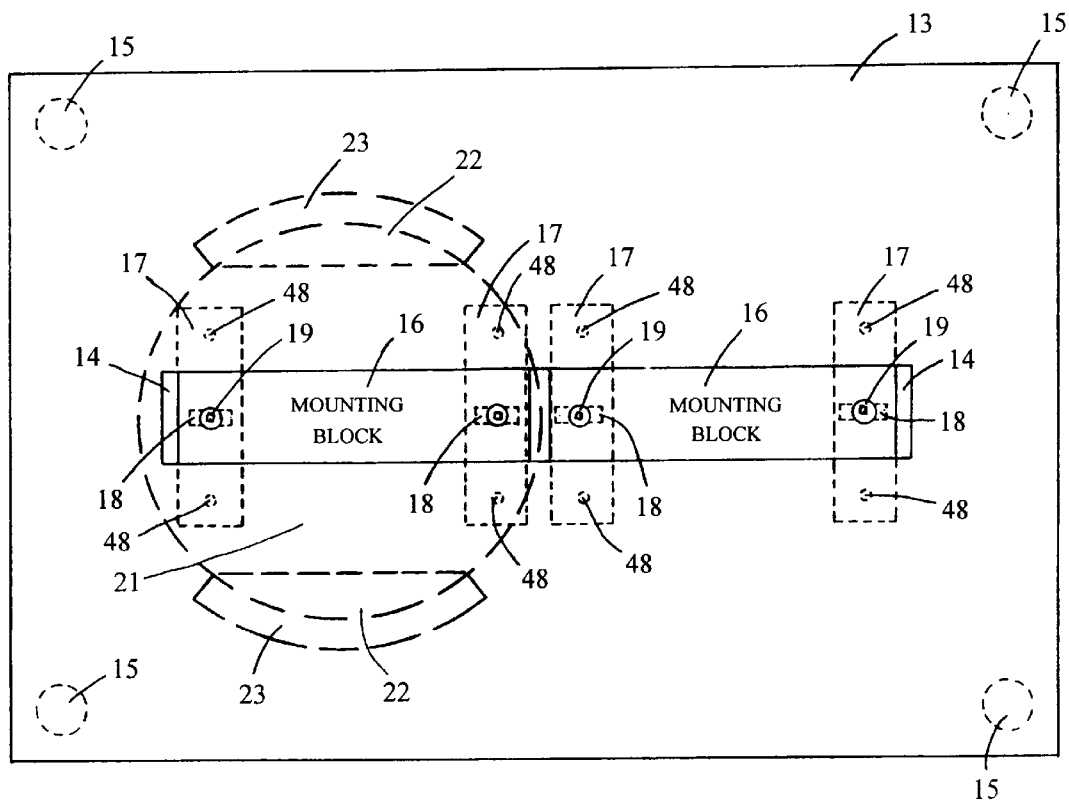
FIG. 2 shows a top view of the working platform showing the detail of how the mounting blocks are secured to the working platform.
Figure 3:
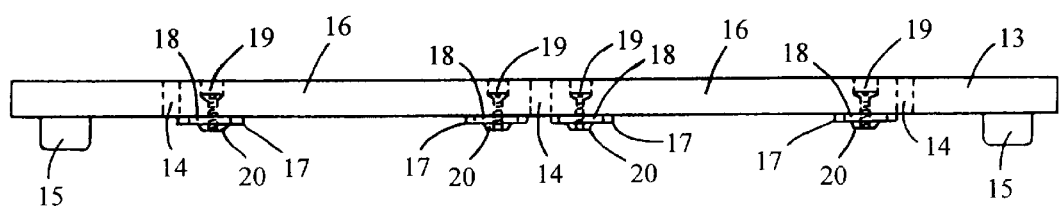
FIG. 3 shows a front view of the working platform with slotted metal plates holding the mounting blocks in position.
Figure 4:
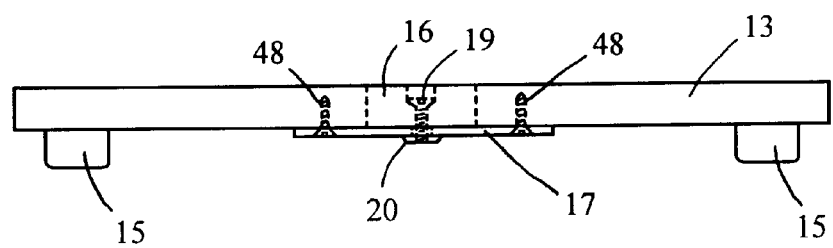
FIG. 4 shows a side view of the working platform showing the slotted metal plates holding the mounting block in position.

Now referring to FIG. 2 and 3, a main platform area 13 is shown having a long rectangular slot 14 cut out of its central area. Located in the long rectangular slot 14 are two adjustable workpiece mounting blocks 16. Each adjustable workpiece mounting block 16 rests upon two slotted metal plates 17 which are themselves secured to the underside of the working platform 13 by means of flat-headed wood screws 48. Each adjustable workpiece mounting block 16 is fastened down independently onto the slotted metal plates 17 by means of two flat-headed machine screws 19. The flat-headed machine screws 19 are recessed and screw into T-nuts 20 located underneath the slotted metal plates 17. The T-nuts can slide freely within slots 18 in the metal plates 17 until the flat-headed machine screws 19 are tightened. FIG. 4 shows a side view of slotted metal plates 17 secured to the working platform 13 by flat-headed wood screws 48. FIG. 4 also shows rubber feet 15 which act to prevent the working platform 13 from slipping when the working platform 13 is resting on a flat surface.

Figure 5:
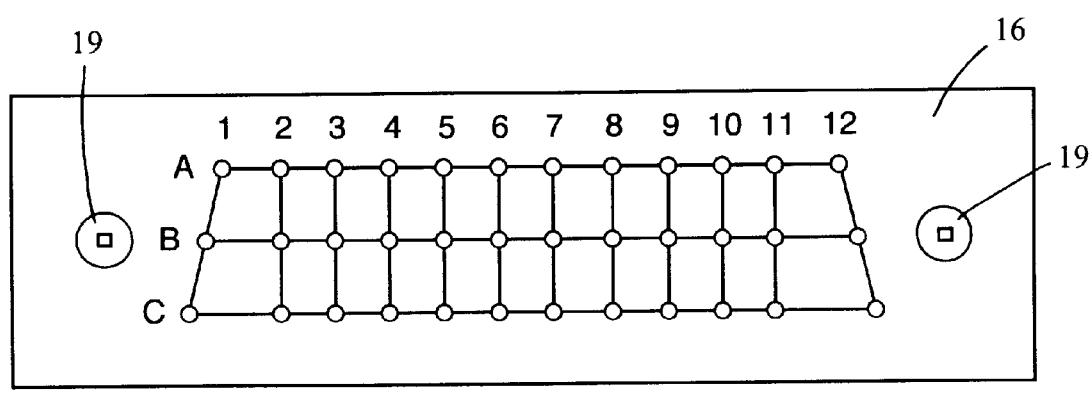
FIG. 5 shows a top view of the mounting block showing the hole grid pattern in detail.

FIG. 5 shows an enlarged view of a workpiece mounting block 16 with a number of small holes arranged in a grid pattern generally comprising three rows and twelve columns. The grid pattern of 36 small holes are labelled A1–A12, B1–B12, and C1–C12. These holes are used for screwing down a template and a workpiece using suitably sized screws, such as flat-headed #6 wood screws. For all of the holes in columns labelled 2–11, the spacing between adjacent holes in each row is exactly ⅜". The holes in column 1 are spaced at ⅜", ⅘", and ⅝" away from the holes in column 2 for rows A, B, and C, respectively. The holes in column 12 are spaced at 7/16", 9/16" and 11/16" away from the holes in column 11 in row A, B, and C, respectively. Conveniently, this arrangement provides mounting holes that can be spaced any distance apart from ⅜ up to about 4", in 1/16" steps.

Figure 6:
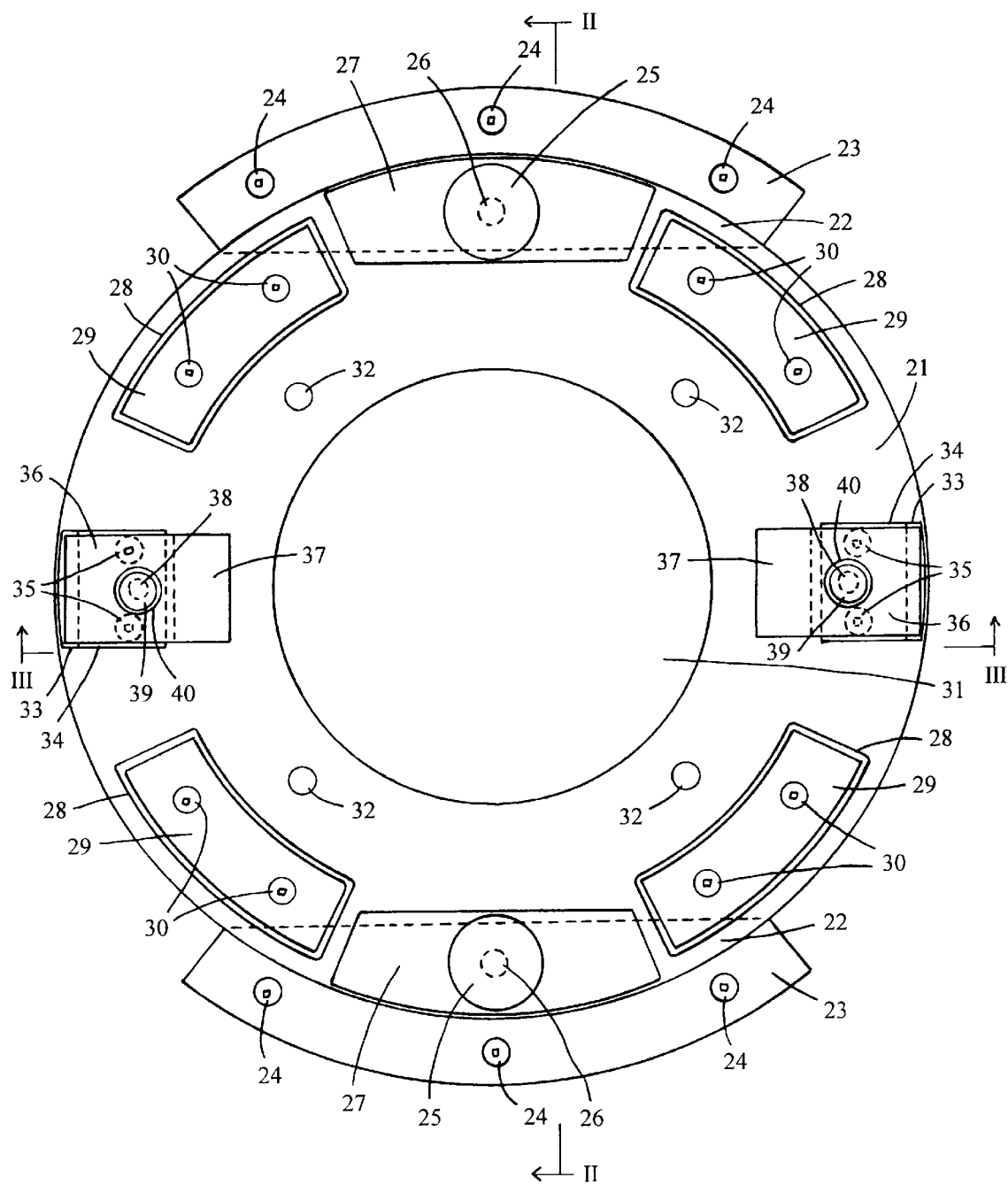
FIG. 6 shows a detailed top view of the router base adapter unit.

Referring back to FIG. 2, an outline of the shapeguide adapter unit's main body 21 is shown with an outline of sidewing feet 22 and sidewing walls 23. This is to illustrate the relative size of the shapeguide adapter unit when it is placed in a typical location on the top surface of the working platform 13. Now referring to the top view of the shapeguide adapter unit in FIG. 6, and also back to FIGS. 1B and 1D, the main body 21 is shown with a large circular hole 31 in its centre. Equally spaced around the main body 21 are four curve-shaped holding blocks 28, each of which is fastened down to the main body 21 by means of two flat-headed machine screws 30 in conjunction with a curve-shaped metal plate 29. The holes in the holding blocks 28 are slightly larger than the diameter of machine screws 30 which screw into threaded holes in the main body 21. This arrangement allows the curve-shaped holding blocks 28 to have a limited amount of adjustment, so that the holding blocks 28 can fit snugly, but not tightly, against the perimeter of the baseplate of a hand-held router.

Figure 7:
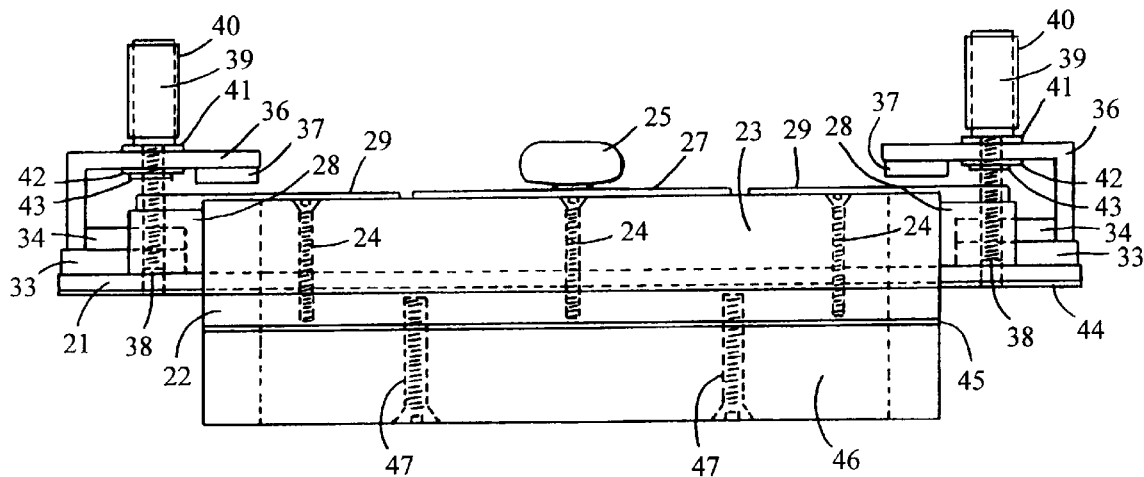
FIG. 7 shows a front view of the router base adapter unit shown in FIG. 6.
Figure 8:
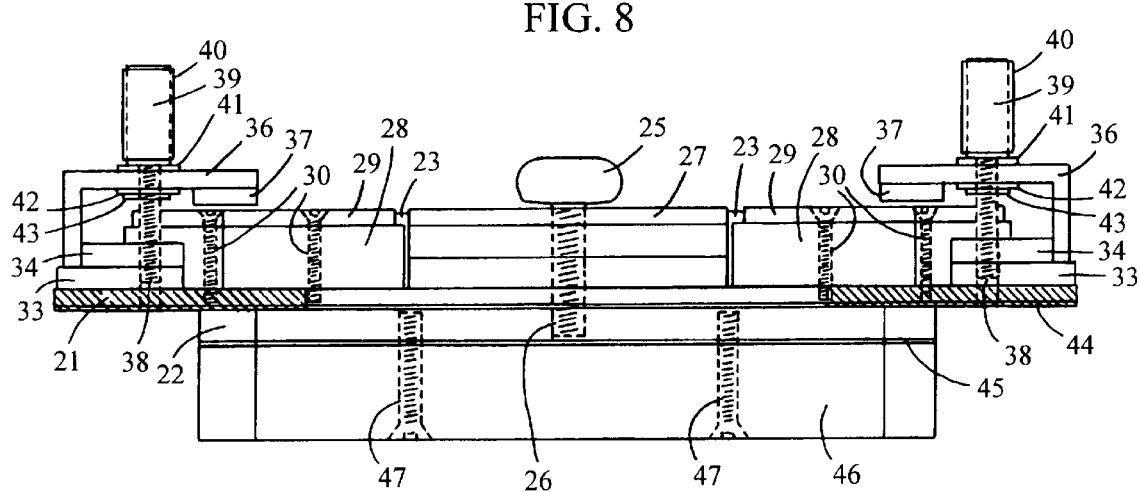
FIG. 8 shows a cross-sectional front view of the router base adapter unit taken along the line III—III indicated in FIG. 6.

Referring now to FIGS. 7 and 8, and also back to FIGS. 1B and 1D, on each side of the main body 21 are two holding clamps each consisting of a right-angled bracket 36, through which a threaded rod 38 passes. The threaded rod 38 is held in place by washers 41 and 42 and also by circlip 43. The threaded rod 38 is joined to a knob 39. The threaded rod 38 and knob 39 are free to rotate but are also loosely held captive to the right-angled bracket 36. Tight fitting rubber tubing 40 is fitted over the outside of the holding clamp knob 39 for better grip, and rubber pads 37 are glued onto the forward undersides of both right-angled brackets 36. The rubber pads 37 cushion the contact between the holding clamps and the base of the hand-held router (not shown), when the hand-held router is secured onto the shapeguide adapter unit. The threaded rod 38 screws into a tapped hole through each clamp attachment plate 34. The tapped hole in each clamp attachment plate 34 is aligned with a clearance hole in each spacer plate 33 as well as in the main body of the shapeguide adapter unit 21. The back or outer end of each right-angled bracket 36 rests on the spacer plate 33 and abuts against the back edge of each clamp attachment plate 34. This arrangement prevents the holding clamp from turning during installation or removal.

Referring now to FIGS. 9 and 10, and also back to FIGS. 1B and 1D, each clamp attachment plate 34 and spacer plate 33 is fastened onto the main body 21 by means of two flat-headed machine screws 35. The underside of the adapter unit main body 21 is covered with a layer of hard plastic 44 glued onto it. At the front and rear of the shapeguide adapter unit are two removable sidewing assemblies, the sidewing assemblies comprising a sidewing foot 22 and a sidewing wall 23 which is fastened to the sidewing foot 22 by means of flat-headed machine screws 24. The underside of each sidewing foot 22 has a layer of hard plastic 45 glued onto it. Each sidewing assembly is attached to the adapter unit main body 21 by means of a screw knob, the screw knob comprising a threaded rod 26 joined to a plastic knob 25, in conjunction with a stack of sidewing spacers 27. All of the sidewing spacers 27 are to be used whenever the sidewings are attached to the adapter unit 21 but each individual sidewing spacer 27 in the stack of spacers may be located either above or below the main body 21. However, both of the sidewings must be treated identically to keep the main body level. Each sidewing height underneath the main body 21 will depend on how many of the individual sidewing spacers 27 are placed above or below the main body 21. As an example, the height adjustments can be made in steps of 1/16" or 1/8". Located underneath each sidewing foot 22 is a removable sidewing sole-block 46, which is attached to each sidewing foot 22 by means of two flat-headed machine screws 47. These removable sidewing sole-blocks 46 effectively double the range of height adjustments possible for the sidewings.

Figure 9A:
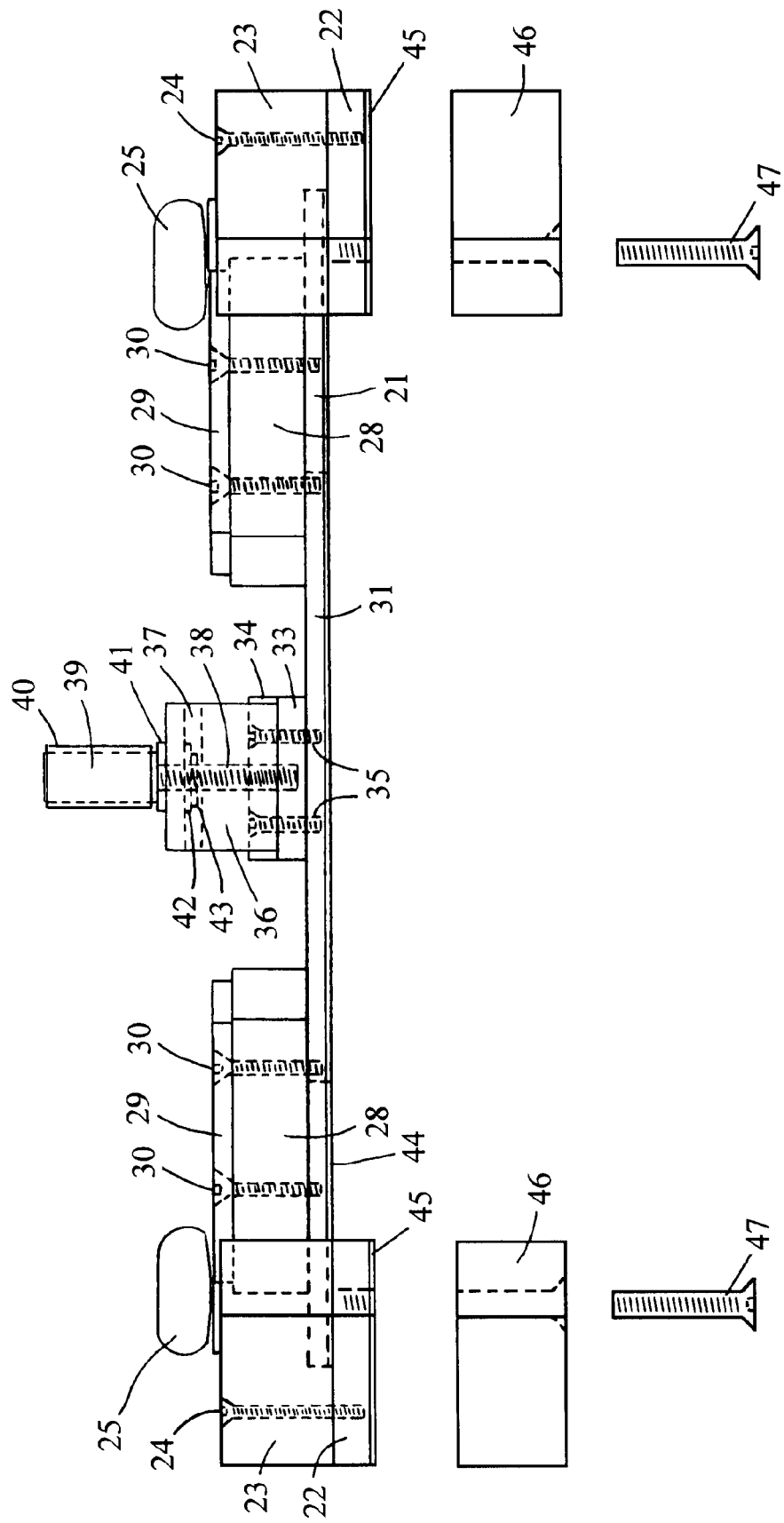
FIG. 9A shows a side of the router base adapter unit shown in FIG. 6 with optional sidewing sole-blocks detached.

In summary, the purpose of the sidewing feet 22 is to support the main body 31 at pre-determined heights and for sliding on the working platform when the removable sole-blocks 46 are not attached (see FIG. 9A). The sidewing feet 22 also provide a base under which the removable sidewing sole-blocks 46 may be optionally attached, to provide an additional range of heights. In this case, it would be the sidewing sole-blocks 46 that are used for sliding on the working platform.

While the preferred embodiment shows a pair of sidewing or spacer feet 22 located on either side of the large circular hole 31, it is possible to substitute one spacer foot having, for example, a U-shape with each branch of the U-shape on either side of the large circular hole 31.

Figure 11:
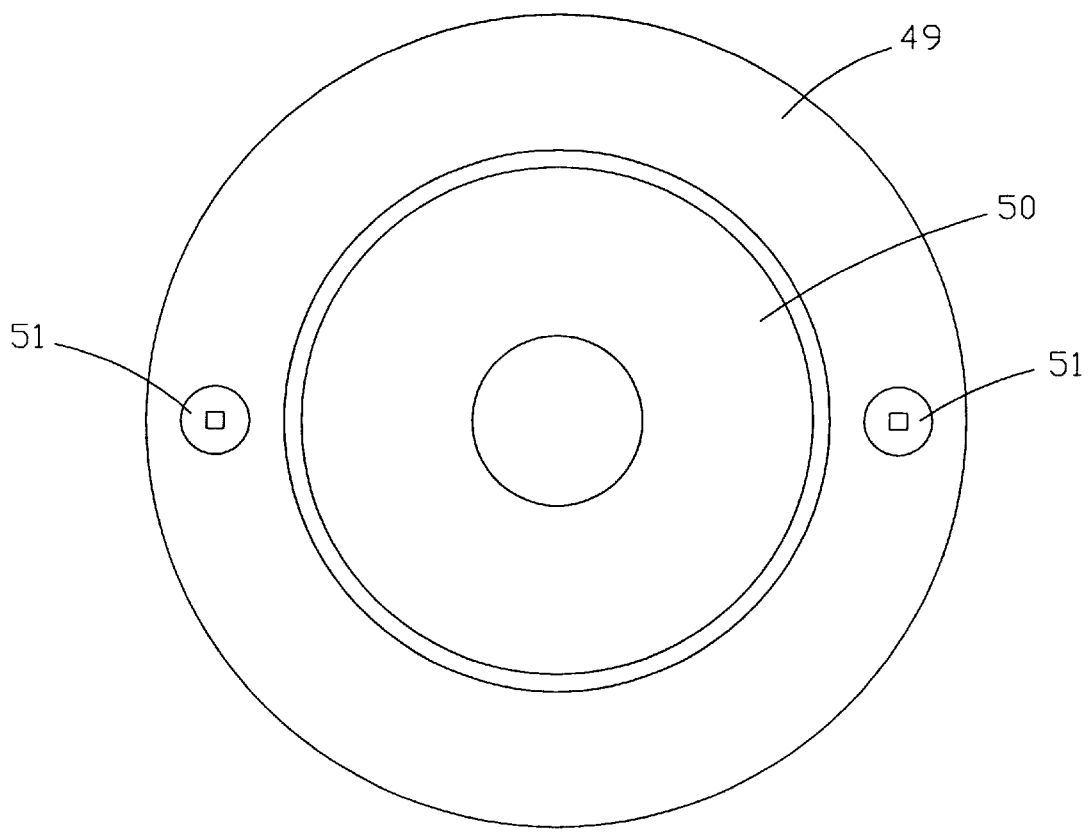
FIG. 11 shows a top view of a circular router base having two locating lugs position at either side of the central hole.
Figure 12:
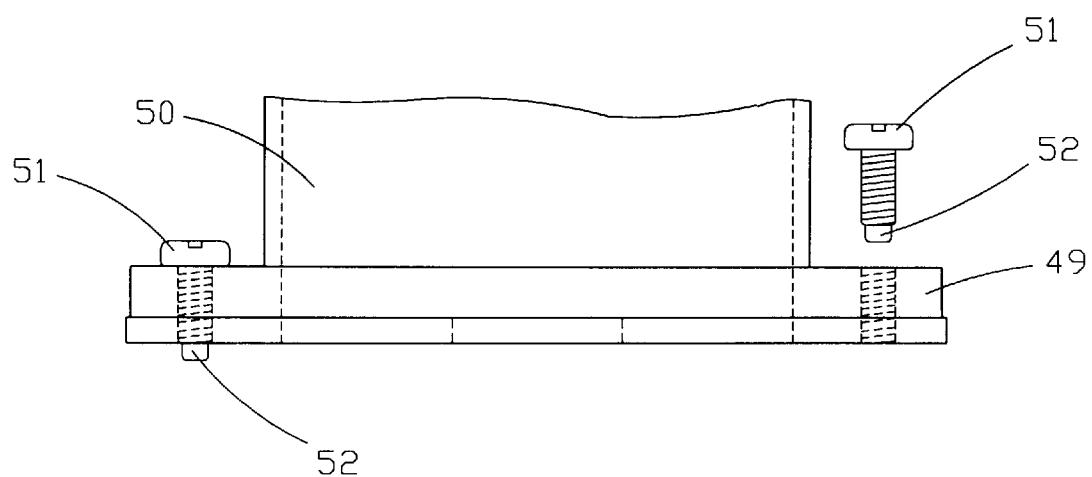
FIG. 12 shows a corresponding front view of the circular router base shown in FIG. 11 and shows a locating lug with a chamfered pin protruding below the lower surface of the circular router base.

Now referring to FIGS. 11 and 12, a circular router baseplate 49 is shown with two locating lugs 51 positioned on opposite sides of router body 50. When installed in the baseplate 49, the locating lugs 51 have a small chamfered pin 52 protruding below the bottom surface of the router baseplate 49. Referring back to FIG. 6, four holes 32 are shown in the adapter unit main body 21 to accommodate the protruding chamfered pins 52. In this manner, the router baseplate 49 is prevented from rotating while seated on the adapter unit main body 21 within the curve-shaped holding blocks 28. Each removable locating lug 51 is essentially a roundheaded 1/4" diameter stove-bolt which has been machined, and fully screwed into a threaded hole in the router baseplate 49, so that a small 3/16" diameter chamfered pin 52 protrudes 1/8" below the bottom surface of the router baseplate 49, as a modification of a standard router base. Alternatively, locating lugs could instead be fastened onto the adapter unit main body 21, which would then fit into matching holes drilled into the router baseplate 49.

Figure 13:
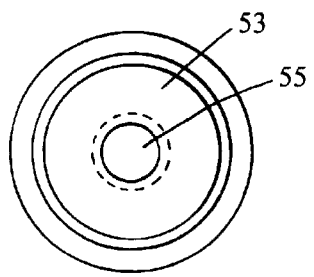
FIGS. 13 and 14 show top and front views, respectively, of a prior art template guide.
Figure 14:
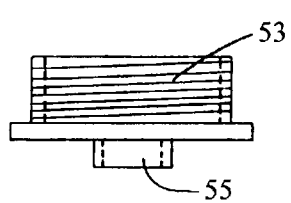
Figure 15:
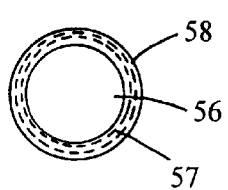
FIGS. 15 and 16 show top and front views, respectively, of a custom machined ferrule.
Figure 16:
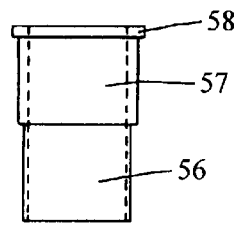
Figure 17:
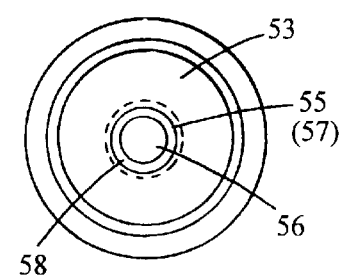
FIGS. 17 and 18 show top and front views, respectively, of the prior art template guide of FIGS. 13 and 14 with the custom machined ferrule of FIGS. 15 and 16 inserted.
Figure 18:
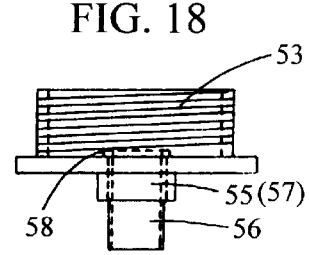
Figure 19A:
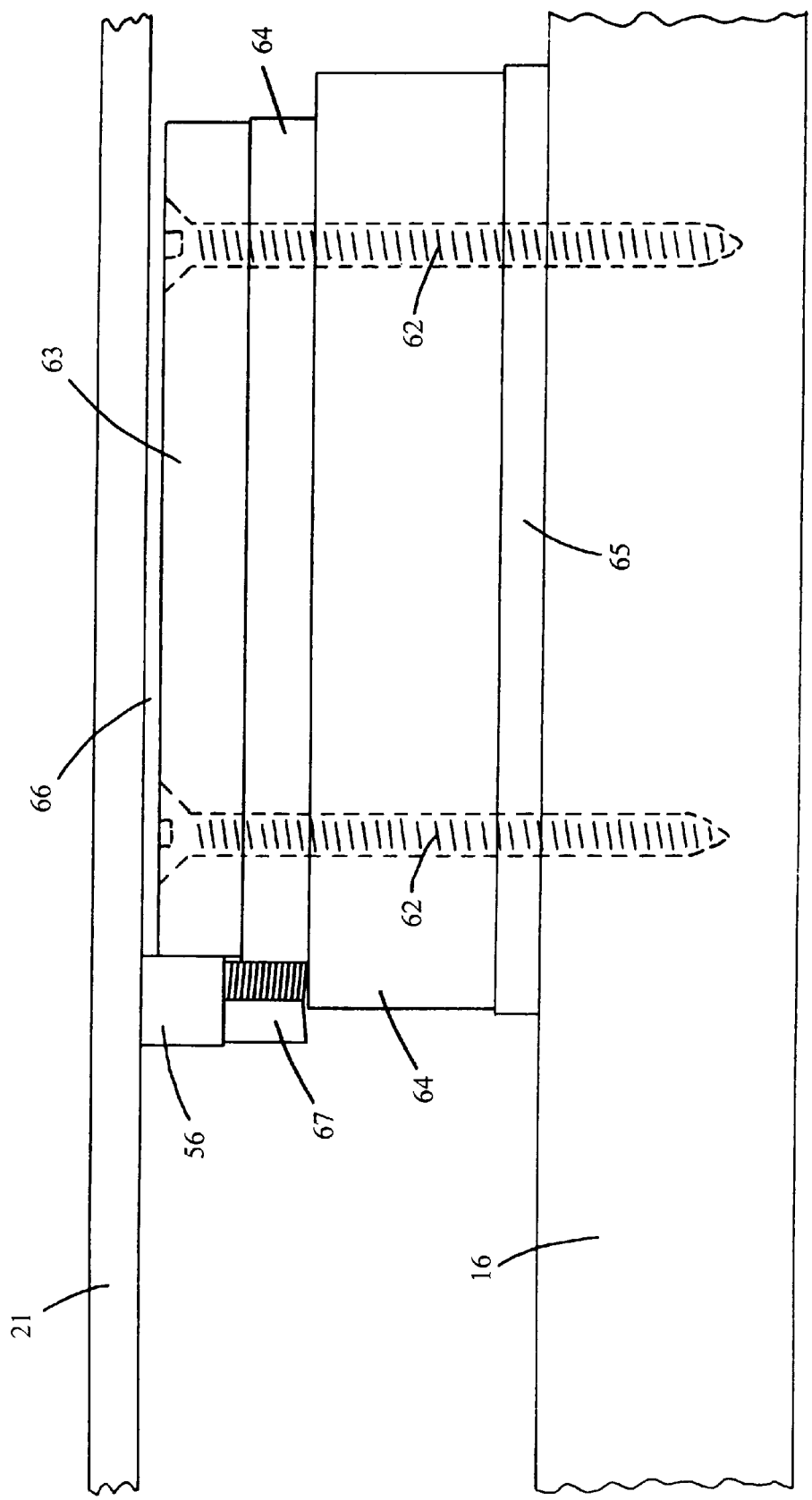
FIGS. 19A and 19B show the router base adapter unit in operation on a workpiece which has been screwed down onto a mounting block in the working platform.
Figure 19B:
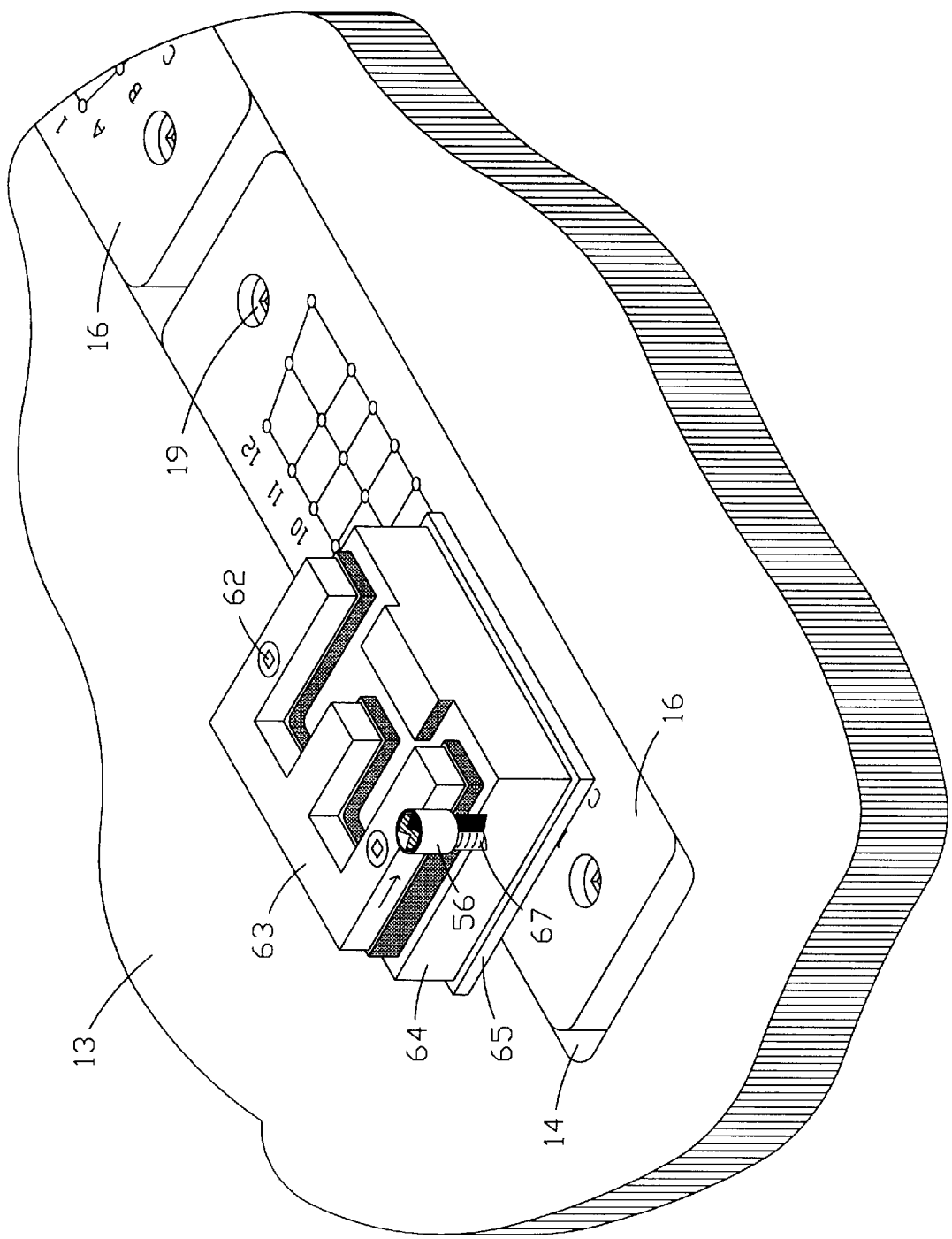

Now referring to FIGS. 13 and 14, a standard prior art template guide 53 is shown. The template guide 53 has a clearance hole 55 for allowing access to a router bit. In FIGS. 15 and 16, a custom machined ferrule is shown. The ferrule has a mid-section 57 which is a press fit into the template guide clearance hole 55, and flange 58 which fits snugly down into the inside surface of standard template guide 53, as shown in FIGS. 17 and 18. A router bit passes through the custom-made ferrule and extends below the guide tube 56 of the ferrule. Referring to FIGS. 19A and 19B, the reason for the extended guide tube 56 is to compensate for the thickness of the main body 21 of the shapeguide adapter unit, and also for the clearance 66 that is necessary between the underside of the main body 21 and the top surface of any custom-made template 63 on the workpiece 64 during use, as further explained below. As shown in FIGS. 19A and 19B, the extended guide tube 56 is butted against the edge of template 63 and the router is guided to follow the contour of template 63. The router bit 67 extends below the guide tube 56 and cuts the workpiece 64 into a shape corresponding to the template 63 in use. While FIGS. 19A and 19B show the workpiece 64 being cut only partially, by varying the length of router bit 67 which extends below the guide tube 56, it is possible to transfer the shape of the template 53 through the entire thickness of workpiece 54. In order to prevent damage to the working platform 13 and mounting block 16, a piece of scrap material 65 can be positioned underneath the workpiece.

Figure 20:
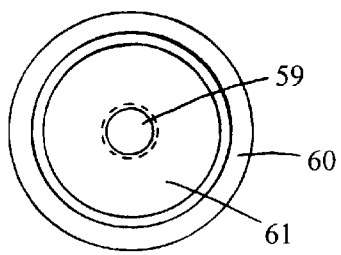
FIGS. 20 and 21 show top and front views, respectively, of an improved version of the template guides with a thicker body section.
Figure 21:
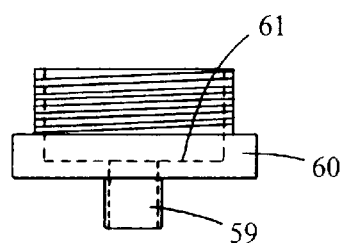
Figure 22:
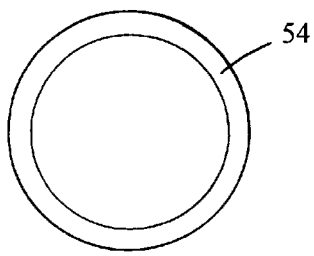
FIGS. 22 and 23 show top and front views, respectively, of a standard template guide nut which will also fit the improved version of the template guide shown in FIGS. 20 and 21.
Figure 23:
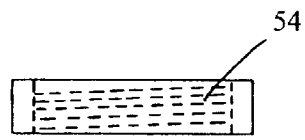

Now referring to FIGS. 20 and 21, an improved version of a template guide is shown. Here, instead of the guide tube 59 being extended to provide the necessary compensation for the thickness of the main body 21, the body section 60 is made thicker. Advantageously, this allows the internal surface 61 to go deeper into the template guide, which provides extra clearance for the collets of the router (not shown). This allows for maximum lowering of the router bit when necessary, as further explained below. In FIGS. 22 and 23, a standard template guide nut 54 is shown. This standard template guide nut 54 can be used with the improved version of the template guide shown in FIGS. 20 and 21.

Figure 25:
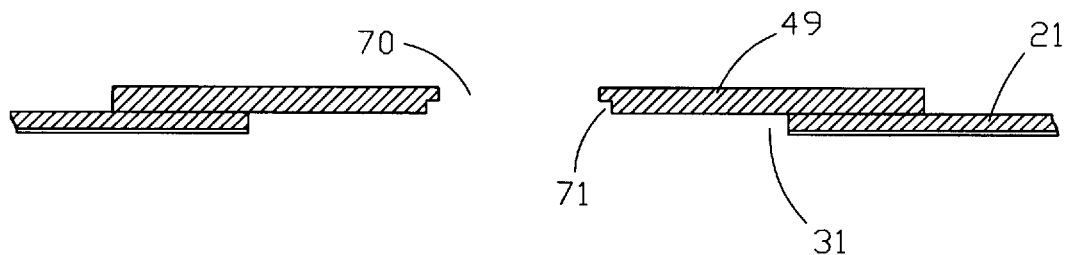
FIG. 25 shows a cross-sectional view of a router baseplate mounted onto the shapeguide adapter unit.

Now referring to FIG. 25, the plastic baseplate 49 of a router has a central hole 70 for the router bit to pass through.

This hole 70 is shaped to have a recessed rim 71 around it so that when a standard template guide is installed into it, the underside of its body section will be flush with the underside of the router baseplate 49. (It should be noted that this feature is not important when the router is mounted in the shapeguide adapter unit, because the extra thickness of the main body 21 of the shapeguide adapter unit would permit the body section of the template guide to project down into the central hole 31 to the underside of the main body 21, and made flush with it instead.)

Figure 26:
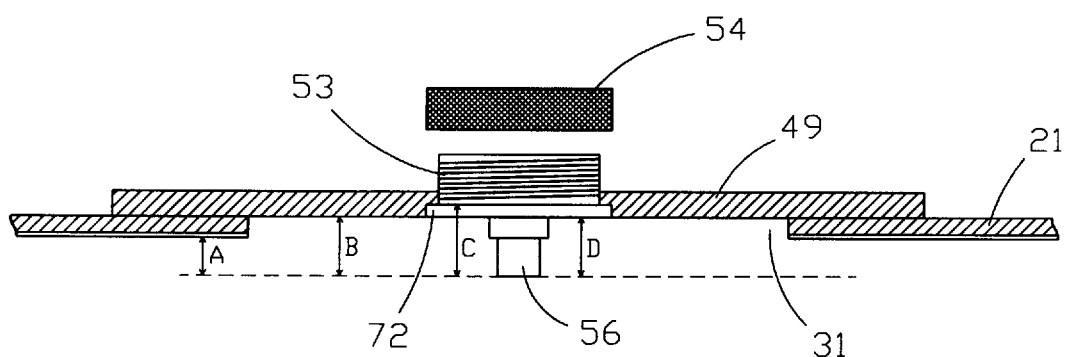
FIG. 26 shows a cross-sectional view of a router baseplate mounted onto the shapeguide adapter unit with the modified template guide located in place.
Figure 27:
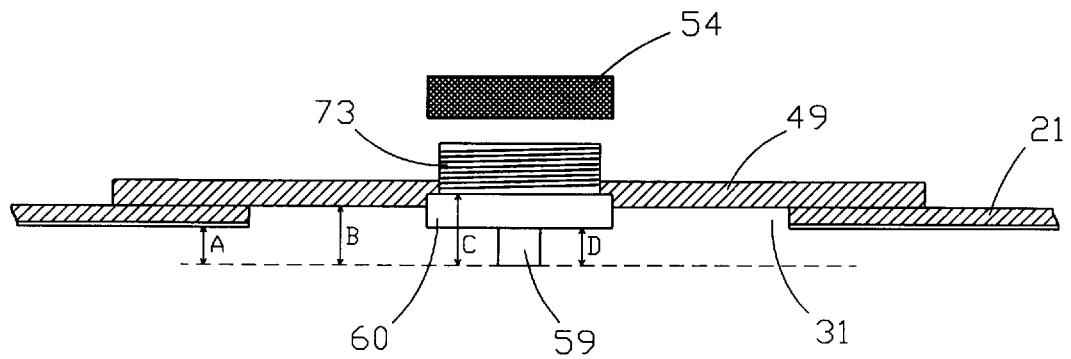
FIG. 27 shows a cross-sectional view of a router baseplate mounted onto the shapeguide adapter unit with the improved version template guide located in place.

Now referring to FIGS. 26 and 27, when a template guide is used with the shapeguide adapter unit, the lower end of the template guide tube 56 and 59 is required to be a certain distance A below the shapeguide adapter unit main body 21, so as to abut the edge of the template being used and also to provide sufficient clearance between the main body 21 and the template, which means that the lower end of the template guide tube 56 and 59 will be distance B below the router baseplate 49 and also distance C below the upper surface of the template guide body section 60 and 72. So long as the distances A, B and C are maintained, it does not matter if distance D is changed so long as the lower surface of the template guide body section 60 does not project below the underside surface of the main body 21 of the shapeguide adapter unit. When the template guide body section 60 is made thicker, then the length of the guide tube 59 will not be as great as it would otherwise be. Also, as described, it will allow the internal surface 61 (shown in FIGS. 20 and 21) to be deeper. This would allow for greater collet clearance when the router blade is fully lowered. This can be further explained as follows: a standard template guide has a guide tube extending downward by only ³⁄₁₆". A template guide that would be suitable for use with the shapeguide adapter unit requires that the guide tube extends downward by ⁷⁄₁₆". This can be accomplished by increasing the length of the guide tube by ¼" or by inserting an extended ferrule into the guide tube of a larger diameter template guide. Alternatively, the thickness of the body section 60 can be increased by ⅛", which would then mean that the guide tube 59 would only have to be extended by ⅛" to achieve the same result. As explained above, this improved template guide would have an advantage by providing greater clearance for the collet of the router, thus enabling the router bit to be fully extended, and the guide tube itself would be stronger because of its shorter length.

When making templates that can be used with the router base adapter unit of the present invention, the preferred practice is first to draw the required shape onto paper or cardboard, and then to transfer that drawing onto a sheet of masonite or hardboard. It has been found that a thickness of ¼" is suitable for a template. The shape of the templates can then be cut out using either a fret saw or a coping saw, followed by detailed filing to obtain the finished shape. Two mounting holes are then drilled through the template. In the preferred embodiment, the mounting holes are ⁵⁄₃₂" in diameter and are also countersunk to accept a #6 flat-headed wood screw. The workpiece to be cut should be prepared by cutting down to the approximate size, and then drilling two ⁵⁄₃₂" diameter mounting holes that match those in the template. Preferably, the distance between the two mounting holes should correspond to one of the distances which are available in the mounting blocks 16, as shown in Table A (FIG. 24). It is not necessary to countersink the mounting holes in the workpiece.

As discussed earlier, if the shape of the templates is to be cut through the full thickness of the workpiece, then a piece of scrap material is required. It has been found that a piece of hardboard ⅛" in thickness is suitable for being used as scrap material. The piece of scrap material should be cut to approximately the same size as the workpiece and also drilled with holes aligned to the holes in the workpiece and template.

As shown in FIGS. 19A and 19B, the workpiece 64 is mounted onto the working platform 13 so that #6 flat-headed wood screws 62 pass through the template 63, workpiece 64, scrap material 65, and finally into the appropriate pre-drilled holes in the working platform mounting blocks 16.

If the spacing between two mounting holes is greater than about 4", then the workpiece can be mounted to span between the two mounting blocks 16 shown in FIGS. 1B and 2. This would provide any mounting hole spacing up to about 12". If the workpieces are small and are of the same thickness, then two separate workpieces, each with its own template, can be mounted at the same time, one on each mounting block 16. This will allow both workpieces to be routed during immediately consecutive cutting operations. If the workpiece is to be embossed, instead of being routed through its full thickness, then there would be no necessity for scrap material 65 to be placed underneath the workpiece. Furthermore, if the shapeguide is used to emboss a series of shapes along a single workpiece, each of the templates will have to be screwed in the required locations on the workpiece prior to routing, but only two of the wood screws would be required to pass right through the workpiece in order to fasten the workpiece down onto the working platform mounting blocks.

The height adjustments for the two sidewings of the adapter unit will depend upon the thickness of the workpiece that is to be routed. This thickness calculation should include the buffer thickness of any scrap material placed underneath the workpiece, but it should not include the thickness of the template above the workpiece as the template thickness is already accounted for (assuming a thickness of ¼"). Referring back to FIG. 10, an equivalent thickness of sidewing spacers 27 should be placed underneath the main body 21 of the shapeguide adapter unit. All remaining sidewing spacers 27 should be placed above the main body 21, before screw knobs 25 and 26 are screwed in to fasten the sidewing assemblies onto the main body 21.

Preferably, the router to be used should have one or two locating lugs 51 screwed into its baseplate 49. Also, the special template guide shown in FIGS. 17 and 18, will have to be installed in the baseplate of the router. In addition, a router bit having a diameter corresponding to the template guide should be used. In the preferred embodiment, the router bit used has a ¼" diameter blade. The router is then placed within the four curve-shaped holding blocks 28 so that the locating lugs 51 will fit into the locating holes 32 in the main body 21. Then, the router is held in place by installing the two holding clamp assemblies. The router, and the router base adapter unit, will then become one integral unit.

When the workpiece and its templates have been mounted correctly on the working platform, and the router base adapter unit has been set up correctly, the actual routing can proceed by holding the router in the usual way by its handles. The router base adapter unit assembly can slide easily on the two sidewing feet to rout in a clockwise direction around the template, with the special template guide being guided around the perimeter of the template. As a general rule, all routing should be done in steps of no more than ⅛" at a time, until the required depth is reached. This will minimize the chance that pieces of material will break out from the workpiece. After the routing is finished, the workpiece can be removed from the mounting block of the working platform, and can then be filed or sanded to remove any rough edges.

While the particular embodiment of the present invention has been illustrated and described, it would be obvious to those skilled in the art that various changes and modifications can be made without departing from the spirit and scope of the invention. It is therefore intended to cover in the claims all of such changes and modifications that are within the scope of this invention.

I claim:

1. An apparatus for use with a router and a workpiece, said router having a router base and a router bit extending down through the centre of said router base, the apparatus comprising:
    a main body for supporting the router;
    locating means for locating the router with respect to the main body and mounted on the main body;
    support means extending down from the main body, for supporting the main body on a support surface for movement across the support surface; and
    a template guide mountable on the router around the router bit and extending below the support means, whereby, in use, with a workpiece and a template secured to the support surface and with a template on top of the workpiece, the router is supported by the main body and the support means above the template and workpiece and the template guide abuts the template to guide the router bit around the template.

2. An apparatus as claimed in claim 1, wherein the main body includes a support plate, on which the router is mounted in use, and the support plate includes a central hole for the router bit and the template guide, the template guide having a length sufficient to project below the support plate for engaging the template in use.

3. An apparatus as claimed in claim 2, wherein the main body includes a plurality of holding blocks located around the periphery of the support plate, for locating the router in position.

4. An apparatus as claimed in claim 3, for use with a router having a generally circular base, wherein the holding blocks are uniformly spaced around the periphery of the support plate and are located at a substantially common radial distance from the central hole.

5. An apparatus as claimed in claim 3, wherein the support means comprises at least one spacer foot extending downwardly from the support plate and including a generally planar bottom surface, for sliding movement across the support surface.

6. An apparatus as claimed in claim 5, which includes a plurality of spacer feet, and wherein the height of each spacer foot is adjustable.

7. An apparatus as claimed in claim 6, wherein each spacer foot includes a plurality of stackable spacers and means for securing the spacer foot and a selected number of the spacers beneath the support plate.

8. An apparatus as claimed in claim 3, which includes clamping means for clamping a router to the main body.

9. An apparatus as claimed in claim 8, wherein the clamping means comprises a pair of clamps mounted on generally opposite sides of the main body.

10. An apparatus as claimed in claim 8, wherein the support plate comprises a substantially circular disk with the central hole located at the centre of said disk, and the holding blocks are evenly positioned around the disk near the edge of the circular disk, and each holding block has a concave inner edge matching the outer curve of a circular router base.

11. An apparatus as claimed in claim 10, wherein said holding blocks are adjustable, to enable the holding blocks to be brought into close abutment with the router base without any clearance between the holding blocks and the router base.

12. An apparatus as claimed in claim 7, wherein the support means comprises a plurality of adjustable spacer feet, and wherein each spacer foot includes a plurality of stackable sidewing spacers, stackable above and below the main body, whereby the height of each spacer foot is adjusted by placing a selected number of the spacer feet below the main body and the remainder of the spacer feet above the main body.

13. An apparatus as claimed in claim 12, which includes at least one mounting block, which mounting block includes a plurality of bores for fastening means for fastening a template and a workpiece to the support surface.

14. An apparatus as claimed in claim 13, wherein the bores are located on a grid pattern and are adapted to receive screws.

15. An apparatus as claimed in claim 14, wherein the grid pattern comprising at least one row of bores, the distance between each adjacent pair of the bores being a set distance, and the grid pattern including at least one additional bore aligned with and positioned at one end of the row of bores, the additional bore being positioned at a distance which is a non-integral multiple of the set distance.

16. An apparatus as claimed in claim 15, wherein said grid pattern comprises three-rows of bores spaced $\frac{3}{8}$" apart in each row, the rows being arranged parallel and spaced apart so as to form ten columns of three bores in a three-by-ten grid, and wherein the grid pattern further includes three bores at one end of the three-by-ten grid, each respectively aligned with one of the three rows and being spaced at $\frac{3}{8}$", $\frac{1}{2}$" and $\frac{5}{8}$" respectively from adjacent bores in the three-by-ten grid, and the grid pattern includes three bores at the other end of the three-by-ten grid, each respectively aligned with one of said three rows and being spaced at $\frac{7}{16}$", $\frac{9}{16}$" and $\frac{11}{16}$" respectively from adjacent bores at the other end of the three-by-ten grid, so as to enable the selection of a pair of bores spaced apart, from $\frac{3}{8}$" to 4 and $\frac{1}{16}$", in $\frac{1}{16}$" increments.

17. An apparatus as claimed in claim 2, wherein the template guide includes an extended guide tube to compensate for the thickness of said main body, whereby sufficient clearance is provided in use between said main body and said template.

18. An apparatus as claimed in claim 2, wherein the template guide has a thicker body section to compensate for the thickness of said main body, whereby sufficient clearance is provided in use between said main body and said template.

19. A method of routing a workpiece using a template, for a workpiece that is too small to provide an adequate support surface for a router, the method comprising:
    (1) securing the workpiece and the template to a support surface with the template on top of the workpiece;
    (2) providing a conventional router having a router base and a router bit extending down through the centre of the router base with an apparatus for supporting the router on the support surface for movement across the surface and with a template guide mounted around the router bit and extending downwardly sufficiently to abut the template; and
    (3) operating the router, and traversing the router and the apparatus across the support surface while maintaining the template guide in abutment with the template, thereby causing the router bit to cut a profile in the workpiece determined by the template.

20. A method as claimed in claim 19, which includes providing an apparatus including a support plate for supporting the base of the router, and adjustable spacer feet secured to the support plate, and wherein the method comprises adjusting the height of the support feet, in dependence upon the combined height of the template and the workpiece, so that the support plate and the router are spaced above the template and so that the template guide extends down a sufficient distance to abut the template.

* * * * *